Oct. 11, 1966     T. I'ANSON     3,278,000
CONVEYOR CHAIN WITH DISCONNECTABLE
BALL BEARING LINK JOINTS
Filed Dec. 14, 1964

INVENTOR.
THOMAS I'ANSON
BY
Orland M. Christensen
ATTORNEY

3,278,000
CONVEYOR CHAIN WITH DISCONNECTABLE BALL BEARING LINK JOINTS
Thomas I'Anson, Bellevue, Wash., assignor to I'Anson Industries, Inc., Seattle, Wash., a corporation of Washington
Filed Dec. 14, 1964, Ser. No. 418,168
8 Claims. (Cl. 198—189)

This invention concerns an improved conveyor chain generally of the type employing pin-coupled coplanar links such as may be used for heavy duty applications in lumber mills and other industrial plants. The invention is herein illustratively described by reference to the presently preferred embodiment thereof; however it will be recognized that certain modifications therein with respect to details may be made without departing from the underlying essentials involved.

In the past the links of such chains have been joined by rivets or pins functioning as the pivot shafts. Consequently disassembly of the links to permit replacement or repair of parts, shortening or lengthening of the chain or disengagement of the chain from its sprockets required grinding off the rivet head or removing cotter pins from the link pins. With large chains such arrangements were inconvenient and expensive. Rapid wear was a problem. Even a slight amount of wear in each link produced considerable elongation of a chain made up of many links, thereby creating a problem with sprocket engagement. Further the strength of former chains was often limited by the reduction in link section produced by the holes for the pins or rivets, the more so with wear around the link or pin.

A broad object of this invention is to devise a stronger, longer wearing conveyor chain of the type generally described which may be assembled and disassembled quickly and without any grinding or cutting operations, which may be made at low cost and which will flex with minimum resistance under load.

A related object is to devise such a chain whose major components may be cast directly in their finished form in a foundry and which may then be connected and held together by low cost anti-friction bearing elements such as hardened steel balls, such balls being readily removable at a later time when it is desired to disconnect the chain links.

A chain made according to this invention in its primary intended applications requires no machining or similar finishing operation. Its links can be made by inexpensive foundy processes, such as shell molding, of any suitable material, such as manganese steel if required. Wear of parts under load is kept to a minimum, and is assumed principally by the steel bearings engaged in the race grooves which are cast directly in the link parts, but since the grooved parts are usually of a work-hardenable material such as manganese steel the groove surfaces quickly harden to the shape of the balls, with minor surface irregularities beng removed in the process. Long-wearing, low-friction couplings are thereby achieved.

In accordance with the invention the bearing balls serve a double-purpose—they act as anti-friction bearing elements and comprise the means for locking the chain links together. By incorporating a normally plugged port in the collar portion of the chain links such bearing balls are normally held in operative relationship in their race grooves, but their removal when required is easily and quickly accomplished by unplugging the port so as to extract the balls through the same, whereupon the links may be separated as desired. The joints are so made that each has space wherein a lubricant can be received and sealed in place, and can be supplemented as needed, and in addition dirt is excluded from the joints. Though the links are accurately interlocked the connecting joints between them are preferably such as to allow limited play as required for purposes of chain alignment with cooperating sprocket wheels that may not be precisely lined up. Futher advantages will appear hereinafter.

The accompanying drawings illustrate the conveyor chain described above, and its individual links and joints, in a form that is presently preferred.

Figure 1:
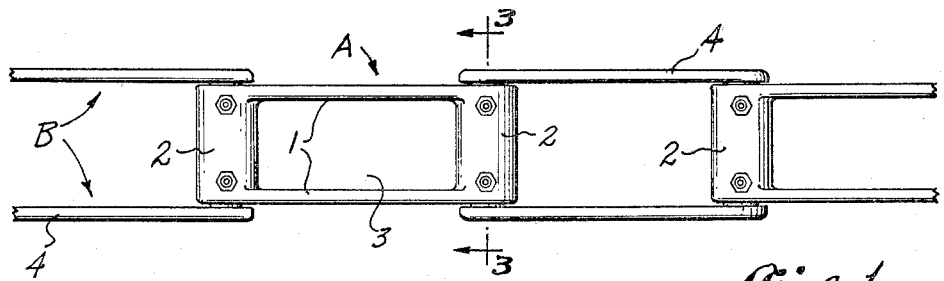
FIGURE 1 is a plan elevation of several joined links of the chain, ready for use.
Figure 2:
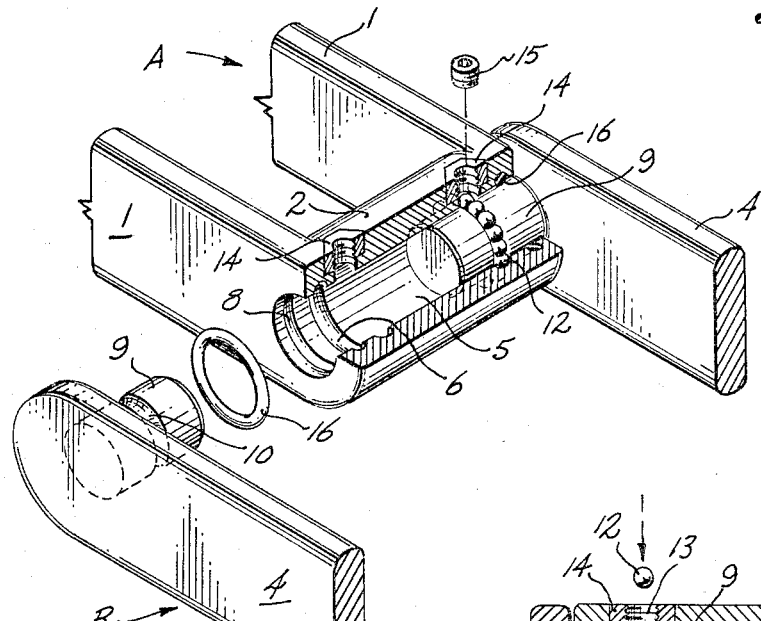
FIGURE 2 is a partly exploded isometric view, with parts shown in section, of an individual joint.

The chain in its illustrated form is made up to two types of links A and B. Links A may be termed rectangular or apertured links, for they include side bars 1 integral with round tubular end portions 2 defining a one-piece loop. The rectangular aperture 3 formed in each link A is of a size and shape to accommodate the sprocket tooth of a sprocket wheel. Links B are designated side links, and comprise two separate units. Each unit includes an elongated bar 4 having stub shafts 9 projecting transversely from the same side thereof at both ends of the bar. The stub shafts 9 fit slidably within the bores 5 of tubular end portions 2 of links A as shown.

Somewhat inwardly from each end of each bore 5 the bore wall is circumferentially grooved with the cross-section of a semicircle at 6. Also formed within each end of each bore, between the groove 6 and the near entrance to the bore 5 is a second circumferential groove shaped to accommodate a rubber O-ring.

Figure 3:
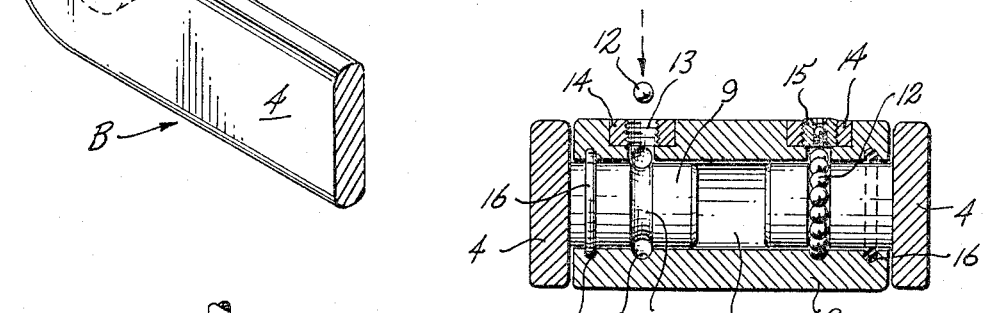
FIGURE 3 is a sectional view, at the line 3—3 of FIGURE 1, through a partly completed joint.

A circumferential semicircular groove 10 is also formed about the surface of each stub shaft at a position of registry with the corresponding groove 6, such registry occurring when the side bars 4 are slightly out of rubbing contact with the side bars 1 of links A. With the two stub shafts 9 of the paired links B fully inserted into the opposite ends of a bore 5, there is still space 11 left between them (FIGURE 3) for reception and storage of grease.

When the links constituting a joint are assembled as just described, they are locked in the assembled relation by filling the registering complementally formed grooves 6 and 10 with hardened steel balls 12, such as are commonly used in anti-friction bearings. These balls are of a size only slightly less than the diameter of the two semi-circular grooves 6 and 10 and not only serve as load-bearing anti-friction elements for the interconnected links, but also lock the links together against withdrawal of stub shafts 9 from bores 5.

Figure 4:
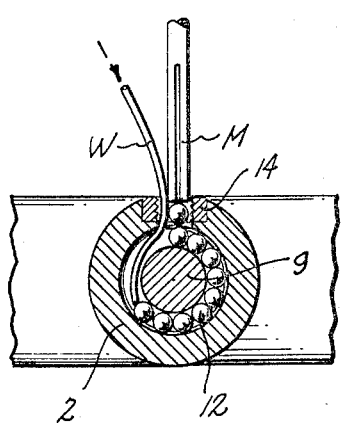
FIGURE 4 is a sectional view, tranversely of a joint, illustrating one way that the bearing balls can be removed from a joint.

In order to insert and remove the balls 12 into and from the race grooves 6, 10, each end portion 2 of link B has apertures 13, of a size to pass the balls leading into the grooves 6. Since it is necessary to plug the apertures 13 for keeping the bearing balls in place and it is also desirable to fill the space 11 and that in and around the ball bearing regions with grease, the apertures 13 are conveniently plugged by grease fittings 15. To receive the grease fitting-plugs in a manner permitting their ready removal when desired, internally threaded nuts 14 are cast in the end portions 2 and the grease fittings are threaded into these units to close the ports 13 represented by the nut bores. The balls can be removed by first removing the grease fitting plugs 15, and then poking the balls around by a flexible wire W (FIGURE 4), removing them with a magnet M, or inverting the joint so that they will fall out.

Grease injected through fittings 15 is sealed in the joint by the rubber O-rings 16 received in the annular grooves 8 and bearing upon the stub shafts 9. These sealing rings also exclude dirt from the joints.

In effect, the balls 12 collectively constitute material that is interposed as a stop between an outwardly facing shoulder on the stub shaft and an inwardly facing shoulder within the bore. For ease of insertion and removal, as well as for their anti-friction load-bearing capability, round steel balls constitute a preferred form of a stop against relative axial movement between link components.

It will be noted that each type of link, A and B, is susceptible of molding by the shell casting technique, hence can be made easily and cheaply. Even the grooves 6 and recesses 8 can be so made. Because of the manner in which the joints are made, parts fit as closely as is desirable, yet no rubbing occurs. The balls 12 are hardened as supplied, and, especially if the links are of manganse steel, these links will work-harden at the grooves 6. The operation of assembling and locking the links in place is simple, and if wear or breakage does occur, it is not difficult with a minimum of tools or equipment to remove and replace a link or links. There is no need to bore holes for reception of a through bolt, and to apply and lock a nut thereon, or to upset a head on a rivet, and later to cut off such a head to remove a link. Lubricant is supplied in ample store, yet can be supplemented as necessary through the cast-in-place fittings 14, 15, and will not leak past the sealing rings 16, nor can dirt enter the joint past them. Though principally of cast construction throughout, the chain constitutes high-quality, long-life, low-friction eqiupment.

These and other aspects of the invention will be recognized from the foregoing description of the improved chain in its presently preferred embodiment.

I claim as my invention:

1. A link chain comprising successive links joined end to end, one link at each of at least certain joints including a transversely bored end portion, and the adjoining link at that joint including two stub shafts directed towards one another and entering the ends of the bore of the first-mentioned link, each stub shaft and the bore having registering annular grooves, a series of balls received in said grooves and of a size to lock the joined links against separation, the bored link having apertures leading to the registering groves for admission or removal of the balls, and a closure for said apertures.

2. A link chain including successive links joined end to end, one such link being transversely bored at one end portion, stub shafts directed towards one another at the adjacent end of the other link of a size to fit within the bore, each stub shaft and its bore having cooperating and registering grooves circumferentially continuous, a series of balls received in said grooves and locking the links against separation, said end portion of the bored link being apertured in registry with each groove, for admission or removal of the balls, and a closure for such apertures.

3. A link chain as defined in claim 2, including a second circumferentially continuous groove formed in one of the bore surfaces or opposing stub shaft surface, at a location spaced outwardly of each of said ball-receiving grooves, and a sealing ring received in each such second groove and bearing in sliding contact upon the opposing surface.

4. A link chain as defined in claim 3, and a grease fitting mounted on the transversely bored link communicating with the bore at a point intermediate the sealing rings.

5. A link chain as defined in claim 3, wherein the two stub shafts in a common bore are of a length to remain spaced apart, to define a grease-receiving chamber intermediate the sealing rings.

6. A conveyor chain including a link centrally apertured to define a sprocket-receiving aperture, and formed with transversely directed and bored cylindrical end portions and integral side portions joining the two end portions, said bored links alternating with a pair of side links joining two bored links, a stub shaft directed laterally from each end of each side link, of a size to fit within the ends of the bores of the bored links which they join, each end portion of the bored links having an inwardly facing shoulder formed at each end of its bore, and the complemental stub shafts having outwardly facing shoulders located inwardly of the shoulder of the bore, and shear coupling means removably interposed between the complemental shoulders around substantially the full circumference thereof at each end of each bore, to lock the links together, the bored links having a normally closed apertures in their end portions, for admitting said locking means to the space between the shoulders and for removing the same at will therefrom.

7. A chain comprising successively interconnected links, one link having a transversely bored end member, and the connecting link including opposite side members each with a stub shaft rotatably received within the respective bore ends of said end member, rolling contact bearing elements, each stub shaft and the surrounding interior of said end member having complementally formed circumferentially continuous formations located in mutual registry to define a race accommodating at least one such bearing element in simultaneous rolling contact with both the stub shaft and said end member while preventing relative withdrawal of the stub shaft from the tubular member, and normally closed passage means formed in one of the links communicating with the respective races for permitting insertion and withdrawal of said bearing elements into and from the races.

8. The chain defined in claim 7, and annular sealing elements cooperating between the respective stub shafts and tubular member at the ends of the latter outwardly from the respective races.

References Cited by the Examiner

UNITED STATES PATENTS

| | | | |
|---|---|---|---|
| 1,961,645 | 6/1934 | Shomaker | 198—189 |
| 3,061,077 | 10/1962 | Koffsinger | 198—189 X |
| 3,086,404 | 4/1963 | Krekeler | 74—254 |
| 3,094,206 | 6/1963 | Stewart et al. | 198—189 |

EVON C. BLUNK, *Primary Examiner.*

R. E. KRISHER, *Assistant Examiner.*